United States Patent
Watanabe

(10) Patent No.: US 10,541,875 B2
(45) Date of Patent: Jan. 21, 2020

(54) WORK MACHINE, MANAGEMENT SYSTEM AND MANAGEMENT METHOD

(71) Applicant: Komatsu Ltd., Tokyo (JP)

(72) Inventor: Mio Watanabe, Fujisawa (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/358,387

(22) PCT Filed: Dec. 11, 2013

(86) PCT No.: PCT/JP2013/083265
§ 371 (c)(1),
(2) Date: May 15, 2014

(87) PCT Pub. No.: WO2015/040764
PCT Pub. Date: Mar. 26, 2015

(65) Prior Publication Data
US 2015/0163101 A1    Jun. 11, 2015

(51) Int. Cl.
*H04L 12/24*    (2006.01)

(52) U.S. Cl.
CPC .................. *H04L 41/12* (2013.01)

(58) Field of Classification Search
CPC .... G07C 5/085; G07C 5/008; G07C 9/00103; G07C 9/00817; G07C 9/00309; G07C 2205/02; G07C 5/0808; G01S 19/13; G06F 11/1458; G06F 13/00; G06F 17/00; G06F 8/65; G06F 21/572; G06F 21/125; G06F 9/44536; H04Q 9/00; G06K 19/0723;
(Continued)

(56) References Cited

U.S. PATENT DOCUMENTS 4,827,115 A *   5/1989   Uchida et al. .............. 235/492
6,430,481 B1 *  8/2002   Lovelace, II ........... B61L 3/125
                                                        701/19
(Continued)

FOREIGN PATENT DOCUMENTS

CN    1248751 A    3/2000
CN    1690992 A    11/2005
(Continued)

OTHER PUBLICATIONS

International Search Report dated Mar. 11, 2014, issued for PCT/JP2013/083265.
(Continued)

*Primary Examiner* — Todd L Barker
(74) *Attorney, Agent, or Firm* — Locke Lord LLP

(57) ABSTRACT

A work machine includes: an electronic device; a signal line to which the electronic device is connected; a memory unit which stores at least identification information for identifying the electronic device; a communication unit which wirelessly communicates to an outside of the work machine; and a processing unit, wherein when the identification information acquired from the electronic device via the signal line is different from the identification information stored in the memory unit, the processing unit stores the identification information acquired from the electronic device in the memory unit and transmits the acquired identification information to the outside of the work machine via the communication unit.

5 Claims, 3 Drawing Sheets

(58) Field of Classification Search
CPC .. G06K 7/0008; G06K 17/0029; B60R 25/24; B60R 25/00; H04L 9/08; H04L 41/12; H04L 69/08; G05B 19/0428; G05B 2219/24001; G05B 2219/35291; G05B 2219/35414; G05B 2219/49305; G06Q 10/087; G08B 25/08; B63J 2099/008; B63B 45/00; Y02P 90/10; G08C 17/02; E02F 9/2054; E02F 9/26
See application file for complete search history.

(56) References Cited

U.S. PATENT DOCUMENTS

| | | | |
|---|---|---|---|
| 6,614,361 B1 | 9/2003 | Kinugawa | |
| 6,840,445 B2 | 1/2005 | Gatz | |
| 7,019,668 B2 | 3/2006 | Kinugawa | |
| 7,103,448 B2 | 9/2006 | Kato et al. | |
| 7,170,998 B2* | 1/2007 | McLintock et al. | 380/277 |
| 7,415,332 B2 | 8/2008 | Ito et al. | |
| 7,532,640 B2* | 5/2009 | Kelly | H04L 69/08 370/352 |
| 7,603,471 B2* | 10/2009 | Sodergren | G05B 19/0423 709/217 |
| 7,783,387 B2 | 8/2010 | Calcagno | |
| 8,068,019 B2* | 11/2011 | Bennie | B60C 23/009 307/9.1 |
| 8,392,764 B2* | 3/2013 | de Buen | H04L 41/12 714/44 |
| 8,412,425 B2* | 4/2013 | Katrak | F16H 61/12 701/30.3 |
| 8,810,364 B2 | 8/2014 | Komine et al. | |
| 8,830,031 B2 | 9/2014 | Komine et al. | |
| 8,854,183 B2 | 10/2014 | Komine et al. | |
| 8,868,267 B2* | 10/2014 | Deitz | B61C 17/12 701/19 |
| 9,043,078 B2* | 5/2015 | Johnson | G07C 5/008 701/32.7 |
| 9,334,820 B2 | 5/2016 | Komine et al. | |
| 9,492,834 B1* | 11/2016 | Bishel | B05B 15/68 |
| 2003/0110482 A1* | 6/2003 | Ferguson | G06F 8/65 717/168 |
| 2003/0193406 A1 | 10/2003 | Kinugawa | |
| 2004/0108378 A1 | 6/2004 | Gatz | |
| 2005/0097541 A1* | 5/2005 | Holland | G06F 8/65 717/168 |
| 2005/0192716 A1 | 9/2005 | Ito et al. | |
| 2005/0216902 A1* | 9/2005 | Schaefer | G06F 8/61 717/168 |
| 2005/0267713 A1* | 12/2005 | Horkavi et al. | 702/188 |
| 2007/0005197 A1 | 1/2007 | Ito et al. | |
| 2007/0086482 A1* | 4/2007 | Pruzan | G07C 5/008 370/466 |
| 2007/0233340 A1* | 10/2007 | Raichle | B60W 50/02 701/29.3 |
| 2008/0177554 A1* | 7/2008 | Srinivasan | G06F 8/76 717/100 |
| 2009/0300365 A1* | 12/2009 | Karmes | G06F 21/572 713/182 |
| 2010/0013594 A1* | 1/2010 | Komine | G05B 19/0428 340/5.8 |
| 2010/0065646 A1* | 3/2010 | Couck | G06F 21/86 235/492 |
| 2010/0205450 A1* | 8/2010 | Sarnacke | G07C 5/0808 713/185 |
| 2010/0259367 A1* | 10/2010 | Kung | 340/10.3 |
| 2010/0324777 A1* | 12/2010 | Tominaga | G07C 5/0808 701/31.4 |
| 2011/0143661 A1* | 6/2011 | Hartwig | G06F 8/65 455/41.1 |
| 2012/0215418 A1 | 8/2012 | Komine et al. | |
| 2013/0131952 A1 | 5/2013 | Komine et al. | |
| 2013/0222573 A1* | 8/2013 | Onuma | E02F 9/24 348/82 |
| 2013/0261839 A1* | 10/2013 | Meyer | G07C 5/0808 701/1 |
| 2013/0325288 A1 | 12/2013 | Komine et al. | |
| 2013/0339721 A1* | 12/2013 | Yasuda | G07C 5/008 713/100 |
| 2014/0068561 A1* | 3/2014 | Halder | G06F 11/3051 717/122 |
| 2014/0098958 A1* | 4/2014 | Kawamura et al. | 380/277 |
| 2014/0250284 A1* | 9/2014 | Kuroyama | G06F 11/1458 711/162 |
| 2014/0266793 A1* | 9/2014 | Velado | G08B 25/08 340/870.16 |
| 2015/0153456 A1* | 6/2015 | Feller | G01S 19/35 342/357.51 |

FOREIGN PATENT DOCUMENTS

| | | |
|---|---|---|
| CN | 101512614 A | 8/2009 |
| DE | 10353257 A1 | 7/2004 |
| JP | 10-315170 A | 12/1998 |
| JP | 2000-076505 A | 3/2000 |
| JP | 2004-062675 A | 2/2004 |
| JP | 2004-148433 A | 5/2004 |
| JP | 2005-273196 | 10/2005 |
| JP | 2006-297589 A | 11/2006 |
| JP | 2007-042061 A | 2/2007 |
| JP | 2012-128702 A | 7/2012 |
| JP | 2013-079570 A | 5/2013 |
| WO | WO-2008/007625 A1 | 1/2008 |

OTHER PUBLICATIONS

Office Action dated Aug. 3, 2018, issued for the Chinese patent application No. 201380003831.8 and a partial translation thereof.
"Vehicle Network Technology," edited by Yongcheng Ling, Mechanical Industrial Press, Jun. 2013, information sheet, pp. 20-28, page of Chapter 4, pp. 125-129.

* cited by examiner

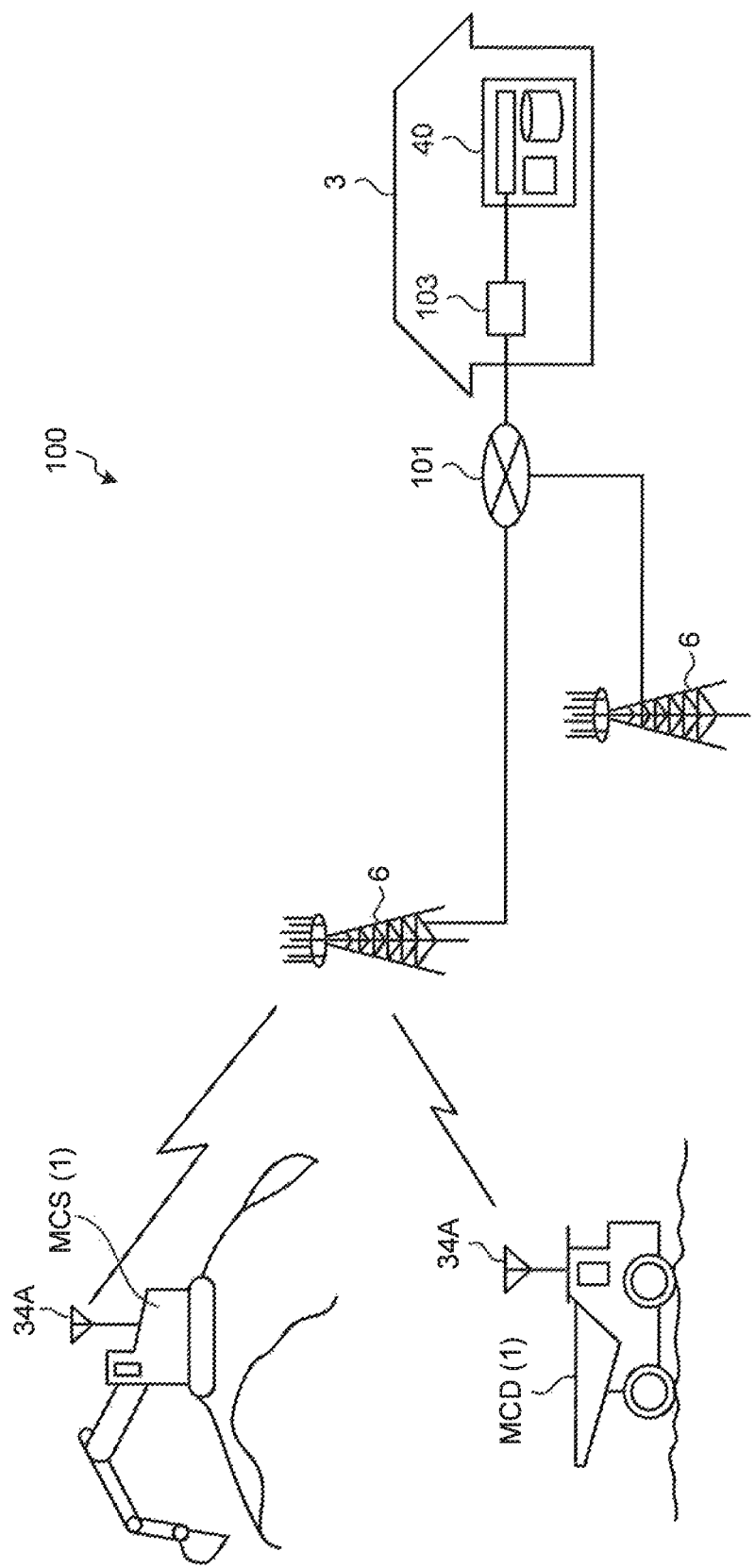

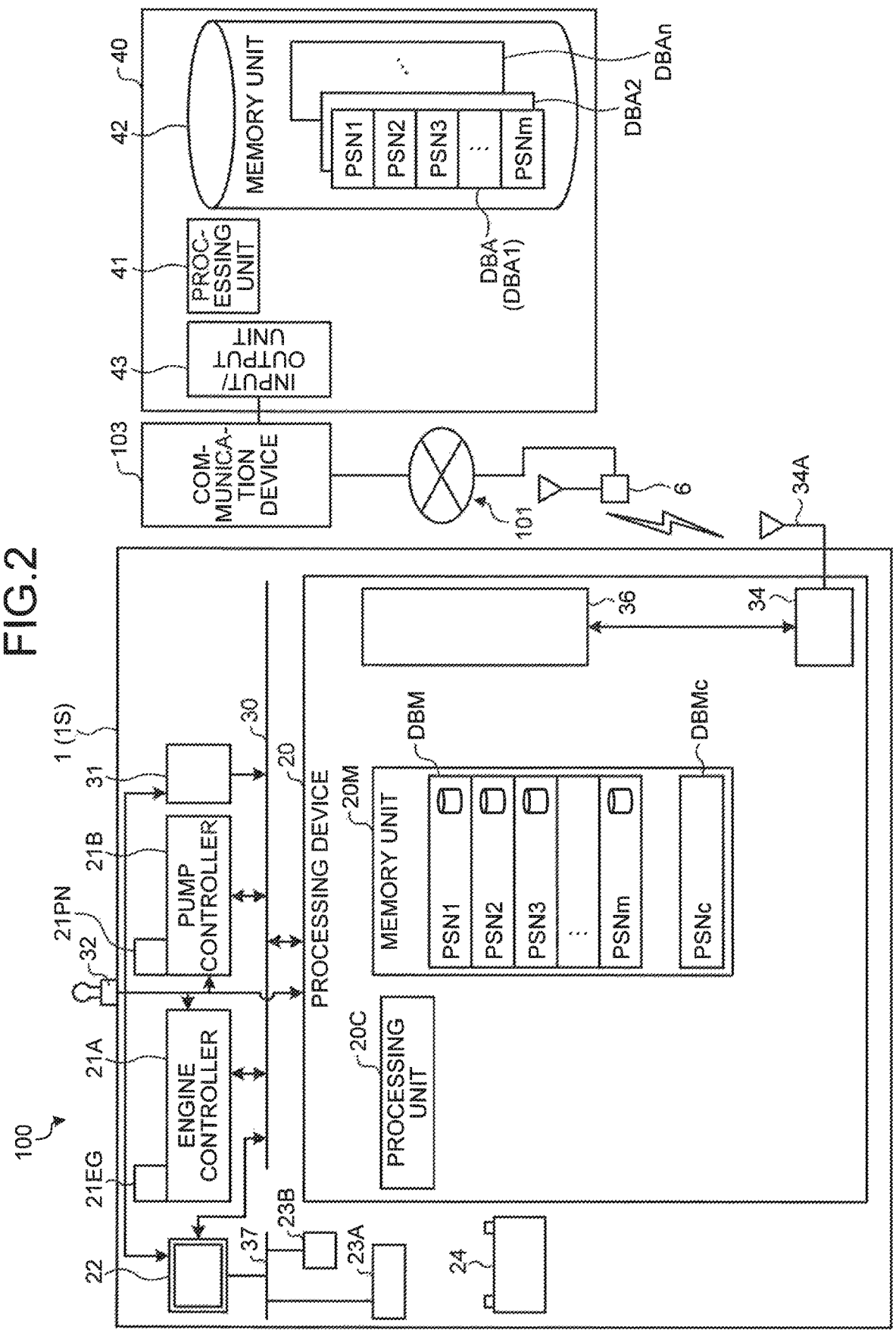

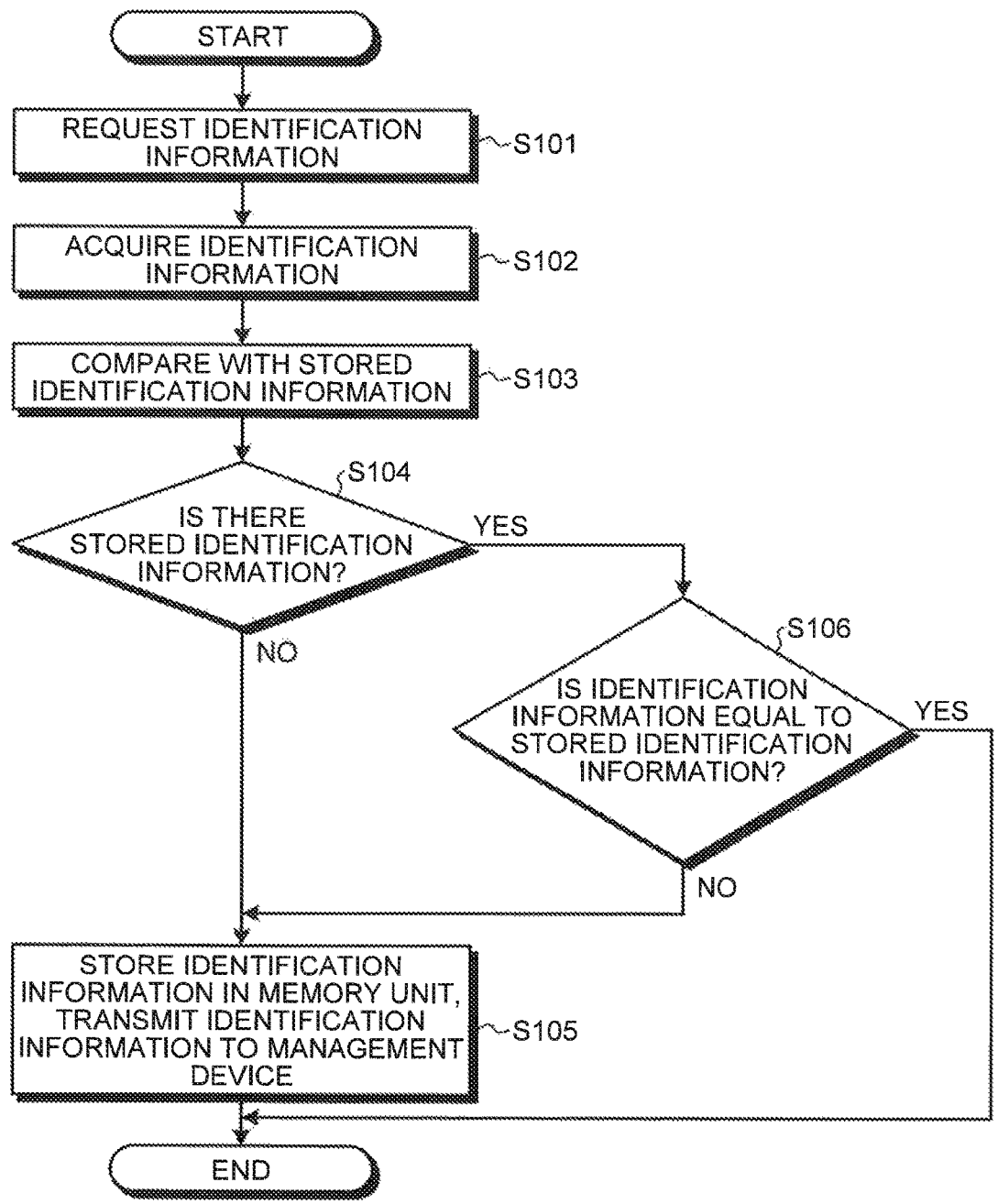

WORK MACHINE, MANAGEMENT SYSTEM AND MANAGEMENT METHOD

FIELD

The present invention relates to a work machine, a management system, and a management method.

BACKGROUND

A work machine such as an excavator or a dump truck is provided with various electronic devices. Such an electronic device, for example, may be upgraded in software version or may be replaced for repairs. In addition, in a case where the software installed in the electronic device is upgraded, there may be a need to upgrade the version of the target work machine. Therefore, a change history of the electronic device provided in the work machine is necessarily managed.

For example, Patent Literature 1 discloses an information management system of an operating device, including an operating device of a construction machine and an information rewriting device which is provided in a management center and transmits control information toward a communication satellite. The information rewriting device is provided with an inquiring means for inquiring a version number of the control information stored in the operating device. In a case where the version number is not the latest one, the control information of the latest version number is transmitted to the operating device of the construction machine for updating.

CITATION LIST

Patent Literature

Patent Literature 1: Japanese Laid-open Patent Publication No. 2000-076505

SUMMARY

Technical Problem

In the technology described in Patent Literature 1, when the version of the control information is updated at an operation site of the construction machine, it is unable to see whether the control information of the construction machine is updated from the management center. Therefore, the information rewriting device of the management center necessarily communicates with management-target construction machines including other construction machines which have not been updated. In addition, the technology described in Patent Literature 1 determines whether the version number is the latest one based on the information of the information rewriting device of the management center. For this reason, for example, in a case where the control information is updated to the latest version number at the site of the construction machine, there is a possibility that the technology described in Patent Literature 1 is unable to determine whether the information rewriting device is updated to the latest version number. Therefore, the technology of Patent Literature 1 has a possibility that the information update in the management center is not securely performed.

An object of the invention is to reliably ascertain a change history for management in a case where an electronic device provided in a work machine is replaced or a software version thereof is updated.

Solution to Problem

According to the present invention, a work machine comprises: an electronic device; a signal line to which the electronic device is connected; a memory unit which stores at least identification information for identifying the electronic device; a communication unit which wirelessly communicates to an outside of the work machine; and a processing unit, wherein when the identification information acquired from the electronic device via the signal line is different from the identification information stored in the memory unit, the processing unit stores the identification information acquired from the electronic device in the memory unit and transmits the acquired identification information to the outside of the work machine via the communication unit.

In the present invention, it is preferable that a sub-electronic device is connected to the electronic device, the memory unit stores identification information for identifying the sub-electronic device, and when the identification information of the sub-electronic device which is acquired via the signal line and the electronic device is different from the identification information stored in the memory unit, the processing unit stores the identification information acquired from the sub-electronic device in the memory unit and transmits the acquired identification information to the outside of the work machine via the communication unit.

In the present invention, it is preferable that the identification information of the electronic device includes part identification information as information for identifying a part of a controlled object which is controlled by the electronic device, the memory unit stores the part identification information, and when the part identification information acquired from the electronic device via the signal line is different from the part identification information stored in the memory unit, the processing unit stores the part identification information acquired from the electronic device in the memory unit and transmits the acquired part identification information to the outside of the work machine via the communication unit.

In the present invention, it is preferable that the work machine further comprises: a power supply which supplies power to the electronic device and the processing device; and a switch which is provided between the power supply, and the electronic device and the processing device to turn on and off the power, wherein the processing unit acquires the identification information from the electronic device connected to the signal line at a timing when the switch operates to supply the power.

According to the present invention, a work machine comprises: an electronic device; a signal line to which the electronic device is connected; a memory unit which stores at least identification information for identifying the electronic device; a communication unit which wirelessly communicates to an outside of the work machine; a processing unit which acquires the identification information from the electronic device connected to the signal line; a power supply which supplies power to the electronic device, the processing unit, and the communication unit; and a switch which is provided between the power supply, and the electronic device and the processing unit to turn on and off the power, wherein the processing unit acquires the identification information from the electronic device connected to the signal line at a timing when the switch operates to supply the power, and when the acquired identification information is different from the identification information stored in the memory unit, the processing unit stores the identification information acquired from the electronic device in the memory unit and transmits the acquired identification information to the outside of the work machine via the communication unit.

According to the present invention, a management system comprises: a work machine which includes an electronic device, a signal line to which the electronic device is connected, a first memory unit which is connected to the signal line and stores at least identification information for identifying the electronic device, a first communication device which wirelessly communicates to an outside of the work machine, and a processing unit which acquires the identification information from the electronic device; and a management device which includes a second communication device which communicates with the first communication device and a second memory unit which stores at least identification information for identifying the electronic device, the management device exchanging information with the processing device via the second communication device and the first communication device, wherein when the identification information acquired from the electronic device via the signal line is different from the identification information stored in the first memory unit, the processing unit stores the identification information acquired from the electronic device in the first memory unit and transmits the acquired identification information to the management device via the first communication device and the second communication device, and the management device updates the identification information of the second memory unit using the identification information of the electronic device acquired via the second communication device.

In the present invention, it is preferable that the identification information includes a plurality of types of information, and the management device changes the plurality of types of information, which are acquired by the processing unit, via the second communication device and the first communication device.

According to the present invention, a management method comprises: acquiring, at a timing when an electronic device provided in a work machine is supplied with power, identification information of the electronic device from the electronic device via a signal line provided in the work machine; and transmitting the acquired identification information to an outside of the work machine when the acquired identification information is different from identification information which is stored so far in a memory unit provided in the work machine.

According to the invention, in a case where an electronic device provided in a work machine is replaced or a software version thereof is updated, the change history can be reliably ascertained for management.

BRIEF DESCRIPTION OF DRAWINGS

FIG. 1 is a diagram that illustrates a site to which a management system according to an embodiment is applied.
FIG. 2 is a diagram that illustrates an example of a management system.
FIG. 3 is a conceptual diagram that illustrates identification information.
FIG. 4 is a diagram that illustrates a processing sequence of a management method according to the embodiment.

DESCRIPTION OF EMBODIMENTS

Modes (embodiments) for carrying out the invention will be described in detail with reference to the drawings.

<Outline of Management System 100>

FIG. 1 is a diagram that illustrates a site to which a management system 100 according to an embodiment is applied. The management system 100, for example, monitors whether an electronic device included in a work machine and at least one of devices (hereinafter, suitably referred to as electronic devices) controlled by the electronic device are changed. The change of the electronic devices includes at least one of a change of an electronic device itself, a change of software installed in the electronic device, and a replacement of parts in the electronic device.

In the example illustrated in FIG. 1, the management system 100 manages the states of a dump truck MCD and an excavator MCS, but in the embodiment, the work machine is not limited to them. For example, the management system 100 may manage a wheel loader, a bulldozer, a fork lift, and the like. In the following description, the dump truck MCD and the excavator MCS may be suitably referred to as a work machine 1.

In the management system 100, for example, a management device 40 collects, from the work machine 1, information on a change history of the electronic devices provided in the work machine 1 via wireless communication system, a wireless LAN (Local Area Network), or a satellite communication which is applied to a mobile communication of a portable phone and the like. The management device 40, for example, is provided in a management center 3. The management center 3 may be provided in a site where the work machine 1 is in operation, or may be provided in a place away from the site where the work machine 1 is in operation, for example, a place where a service person checking the work machine 1 for preventive maintenance or a manager in charge of the site stays. In addition, the management device 40 may be provided in a predetermined place, or may be movable to other arbitrary places such as a mobile terminal having a function of wireless communication.

In the embodiment, the management device 40 is connected to a communication line 101 via a communication device 103. The communication line 101 is connected to a base station 6. The base station 6 relays various kinds of information transmitted from a communication device which is provided in the work machine 1, and transmits the information to the management device 40.

The work machine 1 causes the communication device provided in itself to transmit the change history collected from the electronic devices by its own processing device to the outside via an antenna 34A. The management device 40 acquires various kinds of information, which is transmitted from the communication device of the work machine 1 and includes the change history of the electronic devices, via the base station 6, the communication line 101, and the communication device 103.

The management device 40 can transmit information to the work machine 1. In this case, the management device 40 transmits the information, which is given to the work machine 1, to the communication line 101 via the communication device 103. The information is transmitted from the base station 6 in a form of electric waves. The electric waves including the information which is transmitted from the base station 6 to be given to the work machine 1 is received at the antenna 34A of the work machine 1. The communication device of the work machine 1 subjects the electric waves received by the antenna 34A to a demodulation and conversion process so as to extract the original information which can be understood by a processing device 20 to be described below, and then transmits the information to the processing device 20 of the work machine 1. In this way, the work machine 1 and the management device 40 can exchange the information by wireless communication. Next, the work machine 1, the management device 40, and the management system 100 will be described in more detail.

<Management System 100>

FIG. 2 is a diagram that illustrates an example of the management system 100. The management system 100 manages the change history of the electronic device which is provided in the work machine 1. In other words, in a case where there is some change in the electronic device provided in the work machine 1, the management system 100 manages the changed information. The management system 100 includes an in-vehicle system 1S provided in the work machine 1 and the management device 40 provided in the management center. The in-vehicle system 1S and the management device 40 exchange the information via the communication line 101 and the communication device 103.

In the management system 100, the processing device 20 of the in-vehicle system 1S acquires information (hereinafter, suitably referred to as identification information) PSN1, PSN2, ..., and PSNm for identifying the electronic devices via a signal line 30 provided in the in-vehicle system 1S. The processing device 20 transmits the acquired identification information PSN1, PSN2, ..., and PSNm to the management device 40 via the communication line 101 set outside the work machine 1. In the embodiment, the identification information PSN1, PSN2, ..., and PSNm is expressed in the plural, but the number is not limited. When there is no need to tell the difference between the identification information PSN1, PSN2, ..., and PSNm, the information will be referred to as identification information PSN.

In the embodiment, the description is made on an assumption that one work machine 1, one in-vehicle system 1S, and one management device 40 are connected via the communication line 101 for convenience in explanation. However, there is no limitation on the number of the work machines 1 and the management devices 40. Next, the in-vehicle system 1S will be described.

(In-Vehicle System 1S)

In the in-vehicle system 1S, the processing device 20, an engine controller 21A, a pump controller 21B, a monitor 22, and various types of sensors 31 are connected to the signal line 30. The electronic devices connected to the signal line 30 are configured to communicate with one another. In the following description, the signal line 30 provided in the work machine 1 will be suitably referred to as an in-vehicle signal line 30.

A key switch 32 is provided near a driver seat. A storage battery 24 provided as a power supply of the work machine 1 supplies power to the electronic devices via the key switch 32. The key switch 32 is provided between the storage battery 24 and the electronic devices such as the processing device 20 and the engine controller 21A. When the key switch 32 is turned on, the power is supplied from the storage battery 24 to the electronic devices via the key switch 32. When the key switch 32 is turned off, the power is not supplied from the storage battery 24 to the electronic devices via the key switch 32.

The processing device 20 includes a processing unit 20C, a memory unit (a first memory unit) 20M, an activation control unit 36, and a communication unit (a first communication device) 34. The processing unit 20C, for example, is a central processing unit (CPU). The memory unit 20M, for example, is a random access memory (RAM), a read only memory (ROM), a flash memory, or a combination thereof. The memory unit 20M stores at least the identification information PSN. Besides, the memory unit 20M stores computer programs which contain instructions for the processes performed by the processing device 20.

The identification information PSN of the electronic devices provided in the work machine 1, for example, is stored in a memory area DBM of the memory unit 20M in advance before the work machine 1 is shipped from a factory. The processing device 20 has its own identification information PSNc stored in the memory area DBMc of the memory unit 20M. The identification information PSNc of the processing device 20 itself stored in the memory area DBMc is freely read or written.

The engine controller 21A, the pump controller 21B, the monitor 22, and the like store their own identification information PSN in memory devices that they have. The identification information PSN is rewritten in a case where the software (the computer program) of the electronic devices is reinstalled or in a case where some parts of the electronic devices are replaced for repairs. In this case, the identification information PSN stored in the memory devices of the electronic devices is rewritten with new identification information PSN.

The processing device 20, more specifically the processing unit 20C, acquires the identification information PSN of each electronic device via the in-vehicle signal line 30 at a predetermined timing. The processing device 20 compares the acquired identification information PSN with the identification information PSN stored in the memory unit 20M. As a comparison result, in a case where the acquired identification information PSN is different from the identification information PSN stored in the memory unit 20M, the acquired identification information PSN is stored in the memory unit 20M, and transmitted to the outside of the work machine 1 via the communication unit 34. In this case, the processing device 20 rewrites the identification information PSN stored in the memory unit 20M with the acquired identification information PSN.

After the work machine 1 is shipped from a factory, the work machine 1 may be mounted with new electronic devices to be connected to the in-vehicle signal line 30. In this case, the processing device 20 acquires the identification information PSN of the new electronic devices via the in-vehicle signal line 30. The acquired identification information PSN is new information that has not been stored in the memory unit 20M so far. Therefore, the new identification information PSN is different from the identification information PSN stored in the memory unit 20M. The processing device 20 stores the acquired new identification information PSN in the memory unit 20M, and then transmits the information to the outside of the work machine 1 via the communication unit 34.

As described above, in a case where the identification information PSN acquired at a predetermined timing is different from the identification information PSN stored in the memory unit 20M, the processing device 20 stores the acquired identification information PSN in the memory unit 20M, and transmits the information to the management device 40 via the communication unit 34. Through this process, in a case where the software of the electronic devices provided in the work machine 1 is updated, new electronic devices are replaced for repairs, or new electronic devices are added to the work machine 1, the management device 40 can reliably ascertain the change history of the electronic devices. Therefore, the management device 40 can correctly manage the change history occurring in the work machine 1.

The activation control unit 36 and the communication unit 34 are running in a power saving mode even when the key switch 32 is turned off. When receiving an instruction from the management device 40 via the communication unit 34, the activation control unit 36 can make the power supplied to the processing unit 20C to activate it. Also by operating the key switch 32, the power can be supplied to the processing device 20. When the key switch 32 is turned off, in a case where the communication unit 34 is repeatedly in a power-on period and a power-off period in a predetermined cycle at every predetermined time, a control unit of the communication line 101 may retry the transmitting of the request instruction to the communication unit 34 in a predetermined cycle until the communication unit 34 receives the request instruction.

The communication unit 34 is provided with the communication antenna 34A, and can make wireless communication with the base station 6. The base station 6 is connected to the communication line 101. The communication line 101 is connected to the communication device 103 of the management device 40 side. The communication unit 34 can exchange information with the management device 40 via the base station 6, the communication line 101, and the communication device 103.

The in-vehicle signal line 30, for example, is a Controller Area Network (CAN). The types and number of electronic devices connected to the in-vehicle signal line 30 are not limited to the above-mentioned configuration. Next, another electronic device of the in-vehicle system 1S connected to the in-vehicle signal line 30 will be described.

The engine controller 21A controls an engine 21EG. The engine controller 21A has its own identification information PSN stored in the memory device. In the embodiment, the engine controller 21A also has the identification information PSN of the engine 21EG stored in the memory device. The processing device 20 can acquire the identification information PSN of the engine controller 21A and the engine 21EG from the engine controller 21A.

The pump controller 21B controls a hydraulic pump included in a hydraulic system 21PN of the work machine 1. The hydraulic system 21PN includes the hydraulic pump driven by the engine 21EG and a hydraulic circuit which distributes operating oil discharged from the hydraulic pump to a hydraulic actuator such as a hydraulic cylinder and a hydraulic motor. The pump controller 21B has its own identification information PSN stored in the memory device. In the embodiment, the pump controller 21B also has the identification information PSN of the hydraulic machinery such as the hydraulic pump included in the hydraulic system 21PN, the hydraulic actuator, and a hydraulic control valve stored in the memory device. The processing device 20 can acquire the identification information PSN of the pump controller 21B and the hydraulic machinery from the pump controller 21B.

The monitor 22 is a display which displays various kinds of information on the work machine 1 or serves as an input device. The monitor 22, for example, is a liquid crystal display, and may be provided with a touch panel. In the embodiment, the monitor 22 communicates with the processing device 20, the engine controller 21A, the pump controller 21B, and the various types of sensors 31 using a communication protocol (a first communication protocol) applied to the in-vehicle signal line 30.

In the embodiment, a second signal line 37 which is different from the in-vehicle communication line 30 is connected to the monitor 22. For example, the second signal line 37 is the controller area network (CAN), to which a second communication protocol different from the first communication protocol is applied. The second signal line 37, for example, is connected to a controller 23A and a controller 23B serving as sub-electronic devices. The controller 23A, for example, is an ID key reading device. The controller 23B, for example, is a monitor for monitoring the periphery of the work machine 1. The controllers 23A and 23B communicate with the monitor 22 using the second communication protocol. In this way, the monitor 22 can make communication using different two kinds of communication protocols. Therefore, the monitor 22 can make communication between devices which operate in compliance with different communication protocols. The types and number of sub-electronic devices connected to the second signal line 37 are not limited to the configuration. Another controller other than the monitor 22 may include the sub-electronic devices which are connected via a third signal line different from the in-vehicle communication line 30.

The controller 23A stores the identification information PSN of the ID key reading device. The controller 23B stores the identification information PSN of a peripheral monitoring device. The monitor 22 communicates with the controllers 23A and 23B via the second signal line 37, and acquires the identification information PSN of the controllers 23A and 23B, that is, the identification information PSN of the ID key reading device and the peripheral monitoring device. Then, the processing device 20 communicates with the monitor 22 via the in-vehicle signal line 30, and acquires the identification information PSN of the monitor 22 and the identification information PSN of the ID key reading device and the peripheral device monitor.

The various types of sensors 31 are sensors which are used for detecting the state of the work machine 1. The various types of sensors 31, for example, include a position detecting device which detects a current position of the work machine 1 such as a global positioning system (GPS) sensor, a sensor which detects the rotation speed of the engine 21EG (the engine speed per unit time), a sensor which detects the temperature of cooling water of the engine 21EG (an engine coolant temperature), a sensor which detects the temperature of the operating oil (an operating oil temperature), or the like. The sensors 31 become different depending on the class or type of the work machine 1. In the embodiment, the sensors 31 are connected to the in-vehicle signal line 30, and make communication in compliance with the first communication protocol in which a direct communication can be made with the processing unit 20C. The sensors 31 may have a connection, via a fourth signal line different from the in-vehicle signal line 30, with the electronic device which uses the sensor signals thereof. The sensors 31 have the identification information PSN stored therein. The change history of the sensors 31 thus configured is managed such that the processing device 20 acquires the identification information PSN via the in-vehicle signal line 30 or via the electronic device capable of communicating with the sensors 31.

(Management Device 40)

Next, the management device 40 will be described. The management device 40 manages a change history of the electronic devices which are provided in the work machine 1. The management device 40 includes a processing unit 41, a memory unit (a second memory unit) 42, and an input/output unit 43. The processing unit 41, for example, is a CPU. The memory unit 42, for example, is a RAM, a ROM, a flash memory, a hard disk drive, or a combination thereof. The input/output unit 43 inputs or outputs information between the processing unit 41 and the memory unit 42, and inputs or outputs information between the communication device (a second communication device) 103 connected to the management device 40 and the processing unit 41.

The management device 40 is configured to have the input/output unit 43 electrically connected to the communication device 103. The communication device 103 is electrically connected to the communication line 101. By such a configuration, the management device 40 is connected to the communication line 101 via the communication device 103.

The memory unit 42 of the management device 40 stores at least the identification information PSN. For example, the identification information PSN of one work machine 1 is arranged in one file DBA. In the embodiment, the memory unit 42 stores the identification information PSN of a plurality of work machines 1 as a plurality of files DBA1, DBA2, . . . , and DBAn. The management device 40 manages the identification information PSN of the plurality of work machines 1, but the number of work machines 1 managed by the management device 40 is not limited.

The management device 40, more specifically the processing unit 41 of the management device 40, acquires the identification information PSN, which has been transmitted from the processing device 20 of the work machine 1, via the communication line 101 and the communication device 103. As described above, when the identification information PSN is changed as a result of the change in configuration of the electronic devices provided in the work machine 1, the identification information PSN is transmitted from the work machine 1.

When the identification information PSN is acquired from the work machine 1, in a case where the identification information PSN corresponding to the acquired identification information PSN is present in the memory unit 42, the management device 40 stores the acquired identification information PSN instead of the identification information PSN of the memory unit 42, and updates the change history. In a case where the identification information PSN corresponding to the acquired identification information PSN is not present in the memory unit 42, the management device 40 newly stores the acquired identification information PSN in the memory unit 42.

By this process, in such cases where the software of the electronic devices provided in the work machine 1 is updated, new electronic devices are replaced for repairs, and new electronic devices are added to the work machine 1, the management device 40 can reliably ascertain the change history of the electronic devices for management. Therefore, the management device 40 can correctly manage events which occur in the work machine 1.

In a case where the identification information PSN of the electronic devices is changed by replacing the electronic devices provided in the work machine 1 or by updating the software, the processing device 20 of the work machine 1 automatically transmits the changed identification information PSN to the management device 40. By this function, the management device 40 automatically updates the identification information PSN of the memory unit 42. Therefore, the management device 40 need not request the transmitting of the identification information PSN to the processing device 20 of the work machine 1.

FIG. 3 is a conceptual diagram that illustrates the identification information PSN. In the embodiment, the identification information PSN includes at least an assembly part number A and a hardware serial number B, and may further include a hardware part number C, a software part number D, and a software version number E. In the embodiment, all the data are described to be 8 bits wide, but the size thereof is not limited thereto. In addition, the information belonging to the identification information PSN is not limited to these five types of information, and other types of information may be included. The assembly part number A is a number indicating the types of the electronic devices which are configured by at least one or more hardware components and at least one or more software components, which serves as a unique number for specifying an electronic device among the same types of electronic devices. The hardware serial number B is a serial number for identifying the electronic devices having the same assembly part number A. The hardware part number C is a hardware unique number for specifying hardware components of the electronic devices. The software part number D is a software unique number for specifying a software component installed in the electronic device. The software version number E is a number for distinguishing versions of the software components. Even though the software components are the same type, in a case where the version of the same software component is upgraded, the software version number E becomes different.

In the embodiment, a unique name CN is attached to the identification information PSN. When the processing device 20 of the work machine 1 rewrites the identification information PSN of the memory unit 20M and when the management device 40 rewrites the identification information PSN of the memory unit 42, the unique name CN is used for the comparison of these pieces of identification information PSN. When the unique names CN are the same, it means that those pieces of identification information PSN are of the same electronic device. In a case where the identification information PSN acquired by the processing unit 20C of the processing device 20 from the electronic devices such as the engine controller 21A and the identification information PSN stored in the memory unit 20M of the processing device 20 have the same unique name CN, and are also the same in all of the assembly part number A, the hardware serial number B, the hardware part number C, the software part number D, and the software version number E, both pieces of identification information are matched with each other. In addition, in a case where the identification information PSN acquired from the electronic devices and the identification information PSN of the memory unit 20M have the same unique name CN, but are different in at least one of the assembly part number A, the hardware serial number B, the hardware part number C, the software part number D, and the software version number E, both pieces of identification information are different.

For example, in the case of acquiring the identification information PSN of the engine controller 21A via the in-vehicle signal line 30 illustrated in FIG. 2, the processing unit 20C included in the processing device 20 of the work machine 1 retrieves the identification information PSN having the same unique name CN as that of the acquired identification information PSN from the information stored in the memory unit 20M. In a case where the identification information PSN having the same unique name CN as that of the identification information PSN of the engine controller 21A is present in the memory unit 20M, the processing unit 20C reads out the identification information PSN from the memory unit 20M. The identification information PSN having the same unique name CN as that of the identification information PSN of the engine controller 21A is the identification information of the engine controller 21A.

The processing unit 20C compares the acquired identification information PSN of the engine controller 21A and the read-out identification information PSN. When the two are different, the processing unit 20C rewrites the identification information PSN which is stored in the memory unit 20M and has the same unique name CN as that of the identification information of the engine controller 21A into the acquired identification information PSN of the engine controller 21A. In this way, in a case where the identification information PSN of the engine controller 21A is changed as a result of some change occurring in the engine controller 21A, the identification information PSN of the engine controller 21A stored in the memory unit 20M is rewritten with the changed identification information PSN for updating. Immediately after the rewriting of the identification information PSN, the processing unit 20C transmits the acquired identification information PSN of the engine controller 21A to the management device 40 via the communication unit 34. The timing at which the acquired identification information PSN is transmitted to the management device 40 is not limited as above, and the transmitting may be performed after a predetermined time elapsed from the rewriting.

In a case where the acquired identification information PSN of the engine controller 21A is equal to the read-out identification information PSN, the processing unit 20C does not update the identification information PSN which is stored in the memory unit 20M and has the same unique name CN as that of the identification information PSN of the engine controller 21A. In this case, the processing unit 20C does not transmit the acquired identification information PSN of the engine controller 21A to the management device 40.

The processing unit 41 of the management device 40 which has acquired the identification information PSN of the engine controller 21A retrieves, from the information stored in the memory unit 42, the identification information PSN having the same unique name CN as that of the identification information PSN of the engine controller 21A acquired from the work machine 1. In a case where the identification information PSN having the same unique name CN as that of the identification information PSN of the engine controller 21A is present in the memory unit 42, the processing unit 41 reads out the identification information PSN from the memory unit 42.

The processing unit 41 compares the identification information PSN of the engine controller 21A acquired from the work machine 1 and the read-out identification information PSN. When the two are different, the processing unit 41 stores the change history in which the identification information PSN stored in the memory unit 42 and having the same unique name CN as that of the identification information of the engine controller 21A is changed with the identification information PSN of the engine controller 21A acquired by the work machine 1. In this way, in a case where the identification information PSN of the engine controller 21A is changed, the identification information PSN obtained after being changed to the identification information PSN of the engine controller 21A stored in the memory unit 42 of the management device 40 is added and stored.

The identification information PSN of the engine controller 21A has been described as an example for the rewriting of the identification information PSN, but the rewriting of the identification information PSN is also the same as that in the cases of the pump controller 21B and the monitor 22. Even in a case where the processing device 20 of the work machine 1 changes its own identification information PSN, similarly to a case where the identification information PSN of the engine controller 21A is rewritten, the identification information PSN of the memory unit 20M is rewritten, and the changed identification information PSN is transmitted to the management device 40. Next, a processing sequence of a management method according to the embodiment will be described.

FIG. 4 is a diagram that illustrates the processing sequence of the management method according to the embodiment. In Step S101, the processing unit 20C of the processing device 20 illustrated in FIG. 2 requests the identification information PSN of the electronic devices such as the engine controller 21A, the pump controller 21B, and the monitor 22 which are connected via the in-vehicle signal line 30. The electronic devices received the request transmits their own identification information PSN, the identification information PSN of the sub-electronic device which is communicably connected with the electronic devices, and the identification information PSN of parts of the controlled object, to the processing unit 20C via the in-vehicle signal line 30. In Step S102, the processing unit 20C acquires the transmitted identification information PSN.

In the embodiment, the identification information PSN which is requested by the processing unit 20C and acquired from the electronic devices includes at least the assembly part number A and the hardware serial number B as a plurality of pieces of information, and may further include at least one of the hardware part number C, the software part number D, and the software version number E. In addition to these pieces of information, new information may be included. The management device 40 can change a plurality of types of information included in the identification information PSN acquired by the processing device 20 under remote control via the communication device 103 and the communication unit 34 of the work machine 1 illustrated in FIG. 2. In addition, the management device 40 may change the target electronic devices, from which the processing device 20 of the work machine 1 acquires the identification information PSN, via the communication unit 34 of the work machine 1. With this configuration, the management device 40 can easily change the type of the identification information PSN which is transmitted from the work machine 1 operating at the site in a remote place.

The timing at which the processing unit 20C requests the identification information PSN to the electronic devices is not limited, but in the embodiment, the processing unit 20C requests the identification information PSN at the timing when the key switch 32 illustrated in FIG. 2 is turned on, and acquires the identification information PSN via the signal line 30. The software of the electronic devices is generally changed during the time when the key switch 32 is turned off. In addition, also the electronic devices are generally replaced during the time when the key switch 32 is turned off. At the timing when the key switch 32 is turned on, the processing unit 20C requests the identification information PSN, so that immediately after a change occurs in the electronic devices, the change is securely reflected.

In Step S103, the processing unit 20C compares the acquired identification information PSN and the identification information PSN of the memory unit 20M using the unique name CN. In other words, the processing unit 20C compares the acquired identification information PSN and the identification information PSN of the memory unit 20M having the same unique name CN. In Step S104, in a case where the acquired identification information PSN is not present in the memory unit 20M (No in Step S104), the processing unit 20C stores the acquired identification information PSN in the memory unit 20M in Step S105, and transmits the acquired identification information PSN to the management device 40 illustrated in FIG. 2. The storing of the identification information PSN to the memory unit 20M and the transmitting of the identification information PSN to the management device 40 may be performed irrespective of their order.

In Step S104, in a case where the acquired identification information PSN is present in the memory unit 20M (Yes in Step S104), the procedure proceeds to Step S106. In Step S106, in a case where the acquired identification information PSN is different from the identification information PSN of the memory unit 20M having the same unique name CN (No in Step S106), the processing unit 20C stores the acquired identification information PSN in the memory unit 20M in Step S105. Specifically, the processing unit 20C rewrites the identification information PSN of the memory unit 20M with the acquired identification information PSN for updating. In addition, the processing unit 20C transmits the identification information PSN to the management device 40 illustrated in FIG. 2 in Step S105.

In Step S106, in a case where the acquired identification information PSN is equal to the identification information PSN of the memory unit 20M having the same unique name CN (Yes in Step S106), the process of the management method according to the embodiment ends.

In this way, in a case where some change occurs in the electronic devices provided in the work machine 1, the processing device 20 of the work machine 1 can transmit the changed information to the management device 40 with speed. Therefore, the management device 40 can ascertain the change history of the electronic devices provided in the work machine 1 with reliability and speed. In addition, the electronic devices such as the engine controller 21A and the pump controller 21B for controlling an apparatus may also store the identification information PSN of their controlled apparatus. Therefore, in a case where some change occurs in the controlled object apparatus of the electronic devices, the management device 40 rewrites the identification number of the controlled object apparatus in correspondence with the change, and thus can also ascertain the change history of the apparatus controlled by the electronic devices provided in the work machine 1 with reliability and speed.

In the embodiment, in a case where some change occurs in the electronic devices provided in the work machine 1, the processing device 20 of the work machine may display the corresponding event, for example, in the monitor 22 so as to inform an operator. In addition, the description has been made such that the identification information PSN is present so far, but in a case where the identification information PSN has not present for a predetermined period, the processing device 20 of the work machine 1 may determine that the corresponding electronic devices are removed from the work machine 1, delete the identification information PSN from the memory unit 20M, and transmit the event to the management device 40.

Hereinbefore, the embodiment has been described, but the embodiment is not limited to the content. In addition, as the components, those which a person skilled in the art can assume, those which are substantially equal thereto, and those which fall within a range of so-called equivalents are included. Further, the components can be suitably combined. Furthermore, at least one of omissions, substitutions, and changes can be variously made for the components within the scope without departing from the spirit of the embodiment.

REFERENCE SIGNS LIST

1 WORK MACHINE
1S IN-VEHICLE SYSTEM
3 MANAGEMENT CENTER
20 PROCESSING DEVICE
20C PROCESSING UNIT
20M MEMORY UNIT
21A ENGINE CONTROLLER
21B PUMP CONTROLLER
22 MONITOR
23A, 23B CONTROLLER
24 STORAGE BATTERY
30 SIGNAL LINE (IN-VEHICLE SIGNAL LINE)
31 SENSORS
32 KEY SWITCH
34 COMMUNICATION UNIT
37 SECOND SIGNAL LINE
40 MANAGEMENT DEVICE
41 PROCESSING UNIT
42 MEMORY UNIT
100 MANAGEMENT SYSTEM
103 COMMUNICATION DEVICE
PSN, PSN1, PSNc, PSNm IDENTIFICATION INFORMATION

The invention claimed is:

1. A work machine comprising:
a land-based vehicle;
a working device or a lower traveling body;
a first electronic device;
a first signal line to which the first electronic device is connected, the first signal line being a wired in-vehicle signal line;
a memory unit which stores in advance at least identification information for identifying the first electronic device comprised in the work machine;
a communication unit which wirelessly communicates to an outside of the work machine; and
a processing unit which determines whether the identification information acquired from the first electronic device via the first signal line is different from the identification information stored in the memory unit, wherein
when the processing unit determines that the identification information acquired from the first electronic device via the first signal line is different from the identification information stored in the memory unit, the processing unit stores the identification information acquired from the first electronic device in the memory unit and transmits the acquired identification information to a management device via the communication unit,
a second electronic device is connected to the first electronic device, via a second signal line, and the memory unit stores in advance identification information for identifying the second electronic device comprised in the work machine, the second signal line being a wired signal line,
when the identification information of the second electronic device which is acquired via the first signal line and the first electronic device is different from the identification information stored in the memory unit, the processing unit stores the identification information acquired from the second electronic device in the memory unit and transmits the acquired identification information to the outside of the work machine via the communication unit, and wherein the first electronic device is connected to the first signal line and the second signal line which is different from the first signal line, and the first electronic device adapts to a first protocol used with the first signal line and a second protocol used with the second signal line, and wherein the second electronic device is connected to the first electronic device via the second signal line, the second electronic device adapts to the second protocol, and the second electronic device is a device including at least a peripheral device and a controller.

2. A work machine comprising:
a land-based vehicle;
a working device or a lower traveling body;
a first electronic device;
a signal line to which the first electronic device is connected, the signal line being a wired in-vehicle signal line;
a memory unit which stores at least identification information for identifying the first electronic device;
a communication unit which wirelessly communicates to an outside of the work machine; and
a processing unit, wherein
when the identification information acquired from the first electronic device via the signal line is different from the identification information stored in the memory unit, the processing unit stores the identification information acquired from the first electronic device in the memory unit and transmits the acquired identification information to a management device via the communication unit,
the identification information of the first electronic device includes part identification information as information for identifying a part of a controlled object which is controlled by the first electronic device,
the memory unit stores the part identification information, and
when the part identification information acquired from the first electronic device via the signal line is different from the part identification information stored in the memory unit, the processing unit stores the part identification information acquired from the first electronic device in the memory unit and transmits the acquired part identification information to the outside of the work machine via the communication unit,
a second electronic device is connected to the first electronic device, via a wired signal line, and the memory unit stores identification information for identifying the second electronic device,
when the identification information of the second electronic device which is acquired via the signal line and the first electronic device is different from the identification information stored in the memory unit, the processing unit stores the identification information acquired from the second electronic device in the memory unit and transmits the acquired identification information to the outside of the work machine via the communication unit,
wherein the first electronic device is connected to a first signal line and a second signal line which is different from the first signal line, and the first electronic device adapts to a first protocol used with the first signal line and a second protocol used with the second signal line, and wherein the second electronic device is connected to the first electronic device, the second electronic device adapts to the second protocol, and the second electronic device is a device including at least a peripheral device and a controller.

3. The work machine according to claim 1, further comprising:
a power supply which supplies power to the first electronic device and the processing unit; and
a switch which is provided between the power supply, and the first electronic device and the processing unit to turn on and off the power, wherein
the processing unit acquires the identification information from the first electronic device connected to the first signal line at a timing when the switch operates to supply the power.

4. A management system comprising:
a work machine which includes a land-based vehicle, a working device or a lower traveling body, a first electronic device, a first signal line to which the first electronic device is connected, a first memory unit which is connected to the first signal line and stores at least identification information for identifying the first electronic device, a first communication device which wirelessly communicates to an outside of the work machine, and a processing unit which acquires the identification information from the first electronic device, wherein a second electronic device is connected to the first electronic device via a second signal line, the first memory unit stores identification information for identifying the second electronic device, the first signal line is a wired in-vehicle signal line, and the second signal line is a wired signal line; and
a management device which includes a second communication device which communicates with the first communication device and a second memory unit which stores at least identification information for identifying the first electronic device and the second electronic device, the management device exchanging information with the processing unit via the second communication device and the first communication device, wherein
when the identification information of the first electronic device or the identification information of the second electronic device acquired through the first electronic device is different from the identification information stored in the first memory unit, the processing unit stores the identification information acquired from the first electronic device or the second electronic device in the first memory unit and transmits the acquired identification information to the management device via the first communication device and the second communication device,
the management device updates the identification information of the second memory unit using the identification information of the first electronic device or the second electronic device acquired via the second communication device, and
wherein the first electronic device is connected to the first signal line and the second signal line which is different from the first signal line, and the first electronic device adapts to a first protocol used with the first signal line and a second protocol used with the second signal line, and wherein the second electronic device is connected to the first electronic device, the second electronic device adapts to the second protocol, and the second electronic device is a device including at least a peripheral device and a controller.

5. The management system according to claim 4, wherein
the identification information includes a plurality of types of information, and
the management device changes the plurality of types of information, which are acquired by the processing unit, via the second communication device and the first communication device.

\* \* \* \* \*